May 14, 1963  S. G. KNIGHT  3,089,232
METHOD OF MAKING A UNIVERSAL COUPLING
Filed March 24, 1960

INVENTOR
SYDNEY G. KNIGHT

BY
Watson, Cole, Grindle & Watson
ATTORNEYS

United States Patent Office 3,089,232
Patented May 14, 1963

3,089,232
METHOD OF MAKING A UNIVERSAL COUPLING
Sidney George Knight, Walmer, England, assignor of one-half to Robert Frederick Oxley, Ulverston, England
Filed Mar. 24, 1960, Ser. No. 17,334
Claims priority, application Great Britain Mar. 26, 1959
6 Claims. (Cl. 29—423)

This invention relates to a method of making couplings of the Hooke type for joining two shafts end-to-end.

One object of the invention is to provide a method for readily manufacturing a coupling which will connect the shafts without perceptible play or backlash while permitting some axial and angular misalignment of the shafts.

According to one aspect of the present invention, in a method of making a Hooke type universal coupling two shaft members each supporting two diametrically-opposed radial trunnions are moulded into a wax block with the shaft members held in end-to-end relationship and the trunnions projecting from the block disposed at 90° intervals around the axis of the shaft member; journal bearings, preferably polytetrafluoroethylene—hereinafter termed P.T.F.E., are fitted over the projecting trunnions; a rigid support is added to support the bearings in relation to each other; and the wax is melted and allowed to run out.

The term "wax" is used in this specification to include, in addition to wax, any other substance which is a known substitute for wax in methods of lost wax casting.

Although P.T.F.E. is preferred as the material for the journal bearings other reasonably stable insulators such as nylon or polythene may be used. Even a metal could be used for the bearings and if the rigid support is thermosetting plastic material, and this is preferred, it could be used directly as the bearings so that the bearings and the rigid support are all in one. An inhibitor might be required to prevent adhesion of metal to thermosetting plastic material.

It should be noted that if P.T.F.E. or nylon or polythene is used for the journal bearings they should make an interference fit with the trunnions.

Preferably, the rigid support is of a settable material which is moulded around the wax block and the material forming the bearings.

The P.T.F.E. bearings for the trunnions could be formed in a single ring of P.T.F.E. which could be opened out to be fitted over the trunnions and then closed and held by a rigid support, but it is preferred that separate pieces of P.T.F.E. are used for each journal bearing, and that the rigid support holds the separate pieces rigidly in relation to each other and prevents any opening out of the bearings due to the interference fit with the trunnions.

Preferably, a part of each trunnion is within the wax block so that after the wax has been run out the trunnions will be capable of movement in the bearings in the direction of their axes to allow some axial misalignment of the shafts to be coupled.

Alternatively, this could be achieved by arranging that the bearings do not embrace both trunnions of each pair right up to their connection with the shaft member.

The invention also embraces couplings made by the methods referred to.

According to a second aspect of the invention, a Hooke type universal coupling comprises two shaft members in end-to-end relationship each having two diametrically-opposed radial trunnions, the four trunnions being disposed at 90° intervals around the axis of the shaft members and fitted with interference fits into P.T.F.E. journal bearings, and a rigid support supporting the bearings in relation to each other.

The invention may be carried into practice in various ways and one method of making a Hooke type universal coupling embodying the invention will now be briefly described by way of example with references to the accompanying drawings in which.

Figure 1:
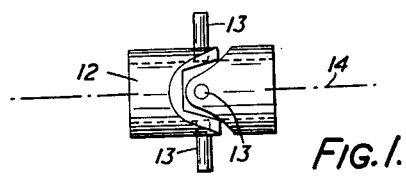
FIGURE 1 is an elevation of the two shaft members positioned in preparation for the making of the coupling.
Figure 2:
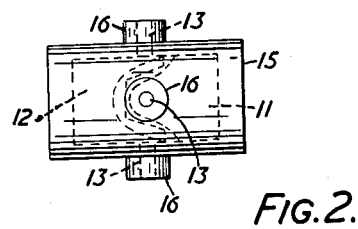
FIGURE 2 is a view corresponding to FIGURE 1 showing a further stage in the method of making the coupling.

Two short tubular shaft members 11 and 12 each formed with two diametrically-opposed external radial trunnions 13 are held in end-to-end relationship in a jig (not shown) with the shaft members 11 and 12 co-axially aligned and with the trunnions 13 disposed at 90° intervals around the shaft member axis 14 in a plane perpendicular to this axis. The jig is part of a mould into which wax is run to form a cylindrical wax block 15 (FIGURE 2) holding the shaft members and their trunnions in the positions described, with parts of the trunnions projecting from the cylindrical surface of the block 15.

Figure 3:
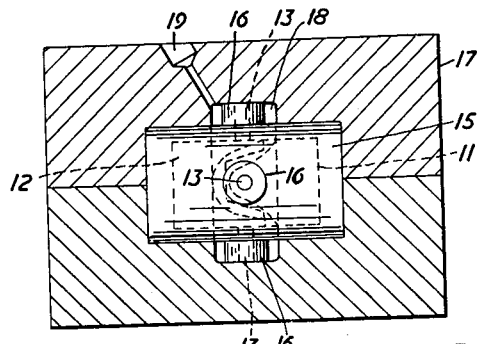
FIGURE 3 is a similar view showing the parts of FIGURE 2 positioned in a mould, the mould, but not the parts of the coupling, being shown in cross-section.

Sleeves 16 of P.T.F.E. are then fitted over the projecting trunnions 13 with an interference fit to provide a journal bearing for each trunnion, and the assembly of the wax block 15 with the shaft members 11 and 12 and the P.T.F.E. bearings 16 is inserted into a mould 17 (FIGURE 3) which is shaped to provide an annular mould cavity 18 surrounding the cylindrical part of the wax block 15 for a short distance midway along its length embracing the P.T.F.E. bearings.

A thermosetting plastic moulding powder is injected into the mould cavity 18 through a feed orifice 19 in the mould and the temperature is raised to cure the plastic and form a rigid plastic support 21 in the form of an annular collar which holds the P.T.F.E. bearings 16 in relation to each other and prevents opening out of the bearing holes due to the interference fit.

Figure 4:
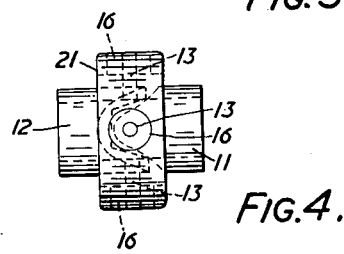
FIGURE 4 is a corresponding view of the finished coupling.

The temperature is then raised further to melt the wax 15 and allow it to run out and leave the completed coupling in which the two shaft members 11 and 12 with their trunnions 13 are coupled together by the plastic supporting collar 21 containing the P.T.F.E. journal bearings 16, as shown in FIGURE 4.

It is of course important that the plastic cures at a temperature below the melting point of wax and that at the melting point of wax the plastic is not damaged. It is preferred to use a fibre-glass-loaded epoxy resin such as that known by the registered trade mark Araldite as the plastic material.

The completed coupling allows the shafts 11 and 12 to have a certain amount of axial and angular misalignment due to the ability of the trunnions 13 to turn in their bearings 16 and to slide axially in their bearings and these movements do not introduce great frictional losses because of the good bearing properties of P.T.F.E.

What I claim as my invention and desire to secure by Letters Patent is:

1. A method of making a Hooke type universal coupling comprising holding in end-to-end relationship two shaft members each supporting two diametrically-opposed radial trunnions; moulding a wax block around said members leaving said trunnions projecting from the block disposed at 90° intervals around the axis of said shaft members; fitting journal bearings over said projecting trunnions; adding a rigid support to said bearings to support said bearings rigidly in relation to each other; and melting said wax allowing it to flow out.

2. A method of making a Hooke type universal coupling comprising holding in end-to-end relationship two shaft members each supporting two diametrically-opposed radial trunnions, moulding a wax block around said shaft members leaving said trunnions projecting from said block disposed at 90° intervals around the axis of said shaft members; fitting polytetrafluoroethylene journal bearings over the projecting trunnions with an interference fit; adding a rigid support to said bearings to support said bearings rigidly in relation to each other; and melting said wax allowing it to flow out.

3. A method as claimed in claim 2 in which said rigid support is added by moulding a settable plastic material around said wax block and said polytetrafluoroethylene forming said bearings and curing said plastic material, the temperature of said plastic material during said moulding and curing steps being below the melting point of said wax.

4. A method as claimed in claim 3 in which separate pieces of polytetrafluoroethylene are used for each journal bearing.

5. A method as claimed in claim 4 in which said wax block is moulded around a part of one trunnion of each diametrically-opposed pair.

6. A method as claimed in claim 2 in which at least one of the bearings of each diametrically-opposed pair does not embrace its trunnion up to the connection between the trunnion and the shaft member.

References Cited in the file of this patent

UNITED STATES PATENTS

| | | |
|---|---|---|
| 470,623 | Levez | Mar. 8, 1892 |
| 1,768,759 | Harris | July 1, 1930 |
| 1,868,282 | Feightner | July 19, 1932 |
| 2,932,884 | Lyon | Apr. 19, 1960 |